United States Patent
Mechelhoff et al.

(10) Patent No.: US 10,239,024 B2
(45) Date of Patent: Mar. 26, 2019

(54) METHOD FOR THE PRODUCTION OF A FILTRATION MEMBRANE HAVING A MEAN MOLECULAR WEIGHT CUT-OFF OF < 1000 G/MOL

(71) Applicant: LANXESS Deutschland GmbH, Cologne (DE)

(72) Inventors: Martin Mechelhoff, Cologne (DE); Patrizia Marchetti, Milan (IT); Andrew Livingston, Welwyn Garden (GB); Zedda Karina, Leipzig (DE)

(73) Assignee: LANXESS Deutschland GmbH, Cologne (DE)

( * ) Notice: Subject to any disclaimer, the term of this patent is extended or adjusted under 35 U.S.C. 154(b) by 148 days.

(21) Appl. No.: 15/311,622

(22) PCT Filed: May 21, 2015

(86) PCT No.: PCT/EP2015/061261
§ 371 (c)(1),
(2) Date: Nov. 16, 2016

(87) PCT Pub. No.: WO2015/177281
PCT Pub. Date: Nov. 26, 2015

(65) Prior Publication Data
US 2017/0095777 A1    Apr. 6, 2017

(30) Foreign Application Priority Data

May 23, 2014 (EP) ..................................... 14169648

(51) Int. Cl.
| | | |
|---|---|---|
| *B01D 71/68* | (2006.01) | |
| *B01D 61/02* | (2006.01) | |
| *B01D 67/00* | (2006.01) | |
| *B01D 69/02* | (2006.01) | |

(52) U.S. Cl.
CPC ........... *B01D 71/68* (2013.01); *B01D 61/027* (2013.01); *B01D 67/0088* (2013.01); *B01D 67/0095* (2013.01); *B01D 69/02* (2013.01); *B01D 2323/12* (2013.01); *B01D 2323/283* (2013.01); *B01D 2323/46* (2013.01); *B01D 2325/20* (2013.01); *B01D 2325/30* (2013.01)

(58) Field of Classification Search
CPC . B01D 67/0093; B01D 67/0088; B01D 71/68
See application file for complete search history.

(56) References Cited

U.S. PATENT DOCUMENTS

| | | | | |
|---|---|---|---|---|
| 4,501,785 A | * | 2/1985 | Nakanishi | .......... B01D 67/0088 |
| | | | | 210/500.36 |
| 4,547,138 A | * | 10/1985 | Mabe | ...................... F01C 21/04 |
| | | | | 418/100 |
| 4,872,984 A | | 10/1989 | Tomaschke | |
| 4,900,449 A | | 2/1990 | Kraus et al. | |
| 4,964,990 A | * | 10/1990 | Kraus | ................ B01D 67/0011 |
| | | | | 210/490 |
| 5,152,901 A | | 10/1992 | Hodgdon | |
| 5,922,203 A | | 7/1999 | Tomaschke | |
| 6,056,903 A | | 5/2000 | Greenwood et al. | |
| 6,464,873 B1 | | 10/2002 | Tomaschke | |
| 2004/0140259 A1 | | 7/2004 | Cummings | |
| 2010/0190965 A1 | | 7/2010 | Yamaguchi et al. | |
| 2014/0048487 A1 | * | 2/2014 | Hjarbæk Holm | ...... B01D 65/02 |
| | | | | 210/650 |

FOREIGN PATENT DOCUMENTS

WO    WO-2012150186 A1 * 11/2012 ............. B01D 65/02

OTHER PUBLICATIONS

Wavhal et al. Hydrophilic modification of polyethersulfone membranes by low temperature plasma-induced graft polymerization, Journal of Membrane Science 209 (2002) 255-269.*
Hwang et al. Effects of Molecular Weight of Polysulfone on Phase Separation Behavior for Cyanate Ester/Polysulfone Blends Journal of Applied Polymer Science, vol. 77, 921-927 (2000).*
Susanto, H. et al., "Effect of membrane hydrophilization on ultrafiltration performance for biocolecules separation", Material Science and Engineering C32, 2012, Elsevier, pp. 1759-1766.
Peng et al., "Protein fouling resistance membrane prepared by amphiphilic pegylated polyethersulfone", Bioresource Technology, 102, 2011, Elsevier, pp. 2289-2295.
Susanto, H. et al., "Via surface funtionalization by photograft copolymerization to low-fouling polyetherfulfone-based ultrafiltration membranes", Journal of Membrane Science, 288, 2007, Elsevier, pp. 157-167.
International Search Report from International Application No. PCT/EP2015/061261, dated Aug. 7, 2015, three pages.
Wavhal, Dattatray S., et al., "Hydrophilic modification of polyethersulfone membrances by low temperature plasma-induced graft polymerization", Journal of Membrane Science, 209, 2002, Elsevier, pp. 255-269.
Hwang, I.W. et al., "Effects of Molecular Weight of Polysulfone on Phast Separation Behavior for Cyanate Ester/Polysulfone Blends", Journal of Applied Polymer Science, vol. 77, 2000, John Wiley & Sons, pp. 921-927.

* cited by examiner

*Primary Examiner* — Alex A Rolland

(57) ABSTRACT

The invention relates to a process for preparing a filtration membrane having an average molecular out-off of <1000 g/mol.

15 Claims, No Drawings

METHOD FOR THE PRODUCTION OF A FILTRATION MEMBRANE HAVING A MEAN MOLECULAR WEIGHT CUT-OFF OF < 1000 G/MOL

The invention relates to a process for preparing a filtration membrane having an average molecular cut-off of <1000 g/mol.

Filtration membranes having an average molecular cut-off of <1000 g/mol are known from the prior art and are particularly useful for nanofiltration, i.e. for removal of molecules having an average molar mass below 1000 g/mol.

Different processes for preparing filtration membranes useful for ultrafiltration, nanofiltration or microfiltration are known.

U.S. Pat. No. 4,900,449, for example, discloses a process for preparing a filtration membrane having microfiltration properties. In this process, polyether sulphone and polyethylene glycol are dissolved in N-methylpyrrolidone or in dimethylformamide and the mixture is applied atop a glass carrier or some other metal-free carrier so as to form the membrane.

U.S. Pat. No. 4,964,990 discloses a process wherein the step of forming the filtration membrane having microfiltration properties by precipitating a mixture of polyether sulphone and polyethylene glycol is followed by a step of crosslinking the resultant membrane with polyvinyl alcohol.

A further process for preparing a filtration membrane having ultrafiltration properties is known from U.S. Pat. No. 6,056,903. In this process, polyether sulphone is dissolved in a solvent and then an aliphatic glycol is added. The solution is then applied atop a fitting substrate, for example a stainless steel, the coated substrate is exposed to the atmosphere and the membrane is then precipitated in the presence of a glycol in a precipitation bath.

Filtration membranes are frequently also hydrophilicized in order to improve the anti-fouling properties or the performance. Three different procedures have been proposed to hydrophilicize filtration membranes: a) modify the membrane polymer by admixture of additives prior to formation of the filtration membrane, b) modify the filtration membrane by admixing the additive during formation, and c) modify the filtration membrane with the additives after formation (aftertreatment process). Aftertreatment processes as per c) by use of ultrafiltration membranes from polyether sulphone with polyethylene glycol are known from H. Susanto at al., Material Science and Engineering C32, 2012, 1759-1766.

There are also fouling-resistant polyether sulphone membranes having ultrafiltration properties that are prepared by use of polyethylene glycol) methyl ether methacrylates (Peng at al., Bioresource Technology, 102 (2011), 2289-2295 or Susanto at al., Journal of Membrane Science, 288, 2007, 157-167).

What the above processes have in common is that the filtration membranes do not meet the separation efficiency expected and desired.

Filtration membranes suitable for nanofiltration or for use in reverse osmosis are typically prepared via interfacial polymerization. EP 1060785 A1 discloses a process for preparing a nanofiltration membrane wherein a microporous supporting membrane, consisting of polysulphone or polyether sulphone for example, is coated with an aqueous solution of bipiperidine derivatives and then contacted with a polyfunctional aromatic or cycloaliphatic carbonyl halide so as to form a bipiperidine-based polyamide membrane.

U.S. Pat. No. 5,152,901 also discloses a nanofiltration membrane obtained by interfacially polymerizing a solution of polyamines and piperazines on a microporous supporting membrane and than treating with oxidizing agents.

A further process for preparing a filtration membrane having nanofiltration properties and reverse osmosis properties is known from U.S. Pat. No. 5,922,203. In this process, a water-permeable membrane is prepared from derivatized polyamines via interfacial polymerization on a microporous support consisting, for example, of polysulphone or polyether sulphone.

The three processes are all disadvantageous in that they are technically inconvenient and hence costly and the filtration membranes obtained are insufficiently resistant at extreme acidic pH values.

There accordingly continued to be a need for a process for preparing a filtration membrane having nanofiltration properties inexpensively and without technological inconvenience.

It was found that, surprisingly, the process of the present invention provides a filtration membrane having nanofiltration properties, i.e. an average molecular cut-off 1000 g/mol, and capable of service under extreme filtration conditions, for example at extreme pH values, without the disadvantages of the prior art.

The invention accordingly provides a process for preparing a filtration membrane having an average molecular cut-off <1000 g/mol, wherein a) at least one filtration membrane having an average molecular cut-off between 3000 g/mol and 15 000 g/mol, comprising at least one bonded textile fabric coated with at least one polyether sulphone or with at least one hydrophilicized polyether sulphone, is contacted with an aqueous medium having a water content of not less than 99%, and b) the filtration membrane from step a) is contacted with at least one polyethylene glycol in the presence of at least one different aliphatic, cyclic or non-cyclic, branched or unbranched, saturated or unsaturated, mono-, di- or trihydric alcohol and polyethylene glycol is used in an amount ranging from 5 wt % to 50 wt %, based on the combined amount of polyethylene glycol and alcohol, and the sum total of polyethylene glycol and alcohol used in process step b) is >95 wt %, based on the overall amount of the mixture used, and c) the filtration membrane from step b) is dried.

The filtration membrane used in process step a) at an average molecular cut-off between 3000 g/mol and 15 000 g/mol preferably comprises for the purposes of the present invention filtration membranes comprising at least one bonded textile fabric coated with at least one polyether sulphone (PES) or with at least one hydrophilicized polyether sulphone (PESH).

The polyether sulphone which is used with preference for the purposes of the present invention is poly(oxy-1,4-phenylenesulphonylphenylene) (PES) CAS No.: 25608-63-3.

Hydrophilicized polyether sulphones are generally polyether sulphones hydrophilicized by the addition of further hydrophilic additives. Examples of such additives include hydrophilic polymers such as, for example, polyvinylpyrrolidone or hydrophilic compounds such as, for example, polyethylene glycols. The hydrophilicized sulphones used are preferably polyether sulphones hydrophilicized by the addition of polyvinylpyrrolidone or polyethylene glycols. Preferably, the hydrophilicized polyether sulphones contain from 5 wt % to 98 wt % of polyether sulphone and from 2 wt % to 10 wt % of hydrophilic additive.

The bonded textile fabrics used may preferably be, for example, polyolefins, e.g. polyethylene or polypropylene or mixtures thereof. The bonded textile fabrics used are preferably fibrous nonwoven webs laid from polyethylene and polypropylene or from mixtures thereof. The bonded textile fabrics may preferably be for example between 50 and 250 µm in thickness. The bonded textile fabrics are more preferably between 100 and 200 µm in thickness.

Membrane is the term used in the present invention for the coating material on the bonded textile fabric.

The membrane may likewise contain further additives in addition to polyether sulphones. Useful additives include, for example, hydrophilic polymers, for example polyvinylpyrrolidone or polyethylene glycols. Additives used are preferably polyvinylpyrrolidones having an average molecular weight of 200 000 g/mol to 400 000 g/mol or polyethylene glycols having an average molecular weight of 200 to 35 000 g/mol.

When the membrane comprises mixtures of polyether sulphones and further additives, the additive content of the membrane is preferably in the range from 5 wt % to 90 wt % and more preferably in the range from 2 wt % to 10 wt %.

The membrane more preferably contains polyether sulphone or hydrophilicized polyether sulphone in an amount >98 wt % based on the overall amount of the membrane. The membrane still more preferably contains >98 wt % of polyether sulphone having an average molecular weight between 40 000 and 100 000 g/mol based on the total amount of the membrane or >98 wt % of hydrophilicized polyether sulphone having an average molecular weight between 40 000 and 100 000 g/mol based on the overall amount of the membrane.

The filtration membranes used in the context of the process according to the present invention at an average molecular cut-off between 3000 g/mol and 15 000 g/mol are available from Microdyn Nadir of Germany for example. NADIR® UH004 and NADIR® UP 005 membranes for example are usable with preference as filtration membranes having an average molecular cut-off between 3000 g/mol and 15 000 g/mol. The filtration membrane used is preferably a filtration membrane comprising hydrophilicized polyether sulphone having an average molecular cut-off between 3000 g/mol and 15 000 g/mol. It is particularly preferable for the starting material used in the process of the present invention to be a NADIR® UH004 filtration membrane from Microdyn Nadir.

Filtration membranes comprising a hydrophilicized polyether sulphone are obtainable, for example, by a polyether sulphone being dissolved in a solvent and then mixed with a hydrophilic additive. The polymer solution is then applied atop a support material, for example a bonded textile fabric, forming a membrane by solvent evaporation. Filtration membranes comprising polyether sulphone are likewise obtainable by dissolving the polyether sulphone in a suitable solvent and then applying and drying this solution atop a suitable support. In addition to this dip-coating process, known for example from H. Susanto et al., Material Science and Engineering C32, 2012, 1759-1766, however, the filtration membranes are likewise obtainable via the interfacial polymerization process known from U.S. Pat. No. 4,872,984 for example.

Filtration membranes are typically also characterized in terms of the salt retention Ft.

$$R = \frac{w(\text{feed}) - w(\text{permeate})}{w(\text{feed})} \times 100 \; [\%]$$

where w is the mass fraction of the particular molecule being retained.

Retention describes the percentage fraction of a retained substance in the permeate based on the concentration in the feed. Retention depends not only on the temperature but also on the transmembrane pressure/flow and the concentration of the initial solution. The retentate contains the retained substance at an increased concentration relative to the feed.

The salt retention of the filtration membranes used in the process of the present invention and obtained in the process of the present invention is measured at a temperature of 25° C. with an aqueous 2000 ppm magnesium sulphate solution at a pressure of 10 bar and a feed volume flow of 4 l/h in a crossflow filtration unit. The measurement is carried out to the point of equilibration in the flux.

The filtration membranes used in step a) of the process according to the present invention typically have a salt retention of 0% to 20% coupled with a flux of 40 to 1000 l/m²h. Preferably, the filtration membranes used in the process of the present invention have a salt retention of 5% to 15% coupled with a flux of 50 to 70 l/m²h.

The aqueous medium used in process step a) has a water content of not less than 99%; preferably the aqueous medium has a water content of 99.9%, The purity of the aqueous medium is determined via its conductivity for example. In this case, the aqueous medium preferably has a conductivity of ≤10 µS/cm at 25° C. More preferably, the aqueous medium has a conductivity ≤1 µD/cm at 25° C.

Polyethylene glycols used in step b) of the process according to the present invention may have a molar mass between 106 g/mol and 35 000 g/mol for example. Polyethylene glycols used in step b) of the process according to the present invention preferably have a molar mass of 106 to 2000 g/mol. Polyethylene glycols used in step b) of the process according to the present invention more preferably have a molar mass of 106 to 600 g/mol. Very particular preference is given to using polyethylene glycols of formula (I)

(I)

where n is from 2 to 10
in the process of the present invention.

Alcohols used in step b) of the process according to the present invention may be, for example, any monohydric, dihydric or trihydric, branched or unbranched, cyclic or non-cyclic, saturated or unsaturated, aliphatic alcohols. The alcohols used in step b) of the process according to the present invention are preferably for example monohydric alcohols, e.g. methanol, ethanol, 1-propanol, 2-propanol, n-butanol, 1-butanol, t-butanol, 1-pentanol, 2-pentanol, 3-pentanol, hexanol, heptanol, octanol, nonanol, 2-methyl-1-propanol, 2-methyl-2-propanol, 2-pentanol, 3-pentanol, 2-methyl-1-butanol, 3-methyl-1-butanol, 2-methyl-2-butanol, 3-methyl-2-butanol, 2,2-dimethyl-1-propanol or dihydric alcohols, e.g. 1,2-ethanediol, 1,2-propanediol, 1,3-propanediol, 1,2-butanediol, 1,3-butanediol, 1,4-butanediol, 2,3-butanediol, 1,5-pentanediol or trihydric alcohols, e.g. 1,2,3-propanetriol or alcohols such as, for example, cyclopentanol, cyclohexanol, prop-2-en-1-ol, but-2-en-1-ol or mixtures thereof. The alcohols used in step b) of the process according to the present invention are preferably monohydric, aliphatic, branched or unbranched and saturated alcohols. The alcohols used are more preferably ethanol, 1-propanol, 2-propanol, n-butanol, 1-butanol, t-butanol, 1-pentanol, 2-pentanol or 3-pentanol or mixtures thereof. The alcohols used are more preferably 1-propanol, 2-propanol and ethanol or mixtures thereof.

Process step b) employs the polyethylene glycol in an amount ranging from 5 wt % to 50 wt % based on the combined amount of polyethylene glycol and alcohol. The polyethylene glycol is preferably used in process step b) in an amount ranging from 10 wt % to 40 wt % based on the combined amount of polyethylene glycol and alcohol.

The total amount of polyethylene glycol and alcohol used in process step b) is preferably >95 wt %, based on the overall amount of the mixture used. The total amount of polyethylene glycol and alcohol used in process step b) is more preferably >98 wt %, based on the overall amount of the mixture used. The balancing remainder in the mixture may preferably be for example water or an organic solvent, for example 2-N-methylpyrrolidone or dimethylformamide.

The volume of the polyethylene glycol and alcohol mixture used in process step b) is immaterial although the volume of the mixture used must of course be sufficient to ensure that the entirety of the membrane can be treated.

The purview of the invention comprehends all the hereinabove and hereinbelow, general or preferred, parameters and explanations in any desired combination with each or one another including, that is, between the particular general and preferred ranges.

The process of the present invention is preferably carried out by rinsing the filtration membrane with the aqueous solution in step a). Similarly, however, the membrane could likewise be placed into or pulled through the aqueous solution. Preferably, the filtration membrane is rinsed with the aqueous solution in step a). In general, the watering period in the bath is between 10 s and 600 s. However, its duration may also be longer or shorter. Preferably, the treatment of the filtration membrane in step a) takes from 10 s to 350 s. Step a) is preferably carried out at a temperature between 20° C. to 25° C. However, step a) may likewise be carried out at other, higher or lower temperatures.

Step b) may be carried out, for example, by introducing the filtration membrane treated as per step a) into the ready-prepared mixture comprising polyethylene glycol and alcohol. Similarly, however, the mixture comprising polyethylene glycol and the alcohol(s) could also be applied atop the filtration membrane from step a), for example by spraying. Preferably, step b) is carried out by the filtration membrane treated as per step a) being placed into or pulled through the mixture of polyethylene glycol and alcohol. Step b) may likewise be carried out at different temperatures; for example, the filtration membrane may also be heated in the course of the treatment.

Step b) is with preference likewise carried out at 20° C. to 25° C. The filtration membrane is treated with the mixture of polyethylene glycol and alcohol in step b) for a period extending preferably, for example, from 1 min to 15 min. Preferably, the filtration membrane is treated in step b) for a period extending from 2 min to 6 min. Thereafter, the filtration membrane may, for example, be removed from the mixture and dried in a step c). Similarly, however, the solution could likewise be poured away with the filtration membrane then being dried in a step c). Preferably, the filtration membrane is removed from the mixture and dried in a step c). Step c) of drying the membrane may be carried out in air, but also under a protective gas, e.g. under nitrogen or argon, or else in vacuo. Preferably, the filtration membrane is air dried in step c). Again, in step c), drying may be augmented by heating. Drying, however, may likewise be carried out at other temperatures, for example at room temperature, or a predrying step could be carried out at lower temperatures and the temperature then raised. Step c) of drying the filtration membrane is preferably carried out at a temperature of 40° C. to 70° C.; step c) of drying the filtration membrane is more preferably carried out at a temperature between 45° C. and 65° C. To attain this temperature, drying step a) may preferably be carried out in a circulating air drying cabinet for example. The filtration membrane is dried in process step c) within a period extending from 1 to 15 min. However, the period may also be longer or shorter. The drying period in step c) is preferably from 1 to 15 min and more preferably from 4 to 11 min.

The filtration membrane obtained as per the process of the present invention has an average molecular cut-off <1000 g/mol. The filtration membrane preferably has an average molecular cut-off between 200 g/mol and <1000 g/mol. The filtration membrane more preferably has an average molecular cut-off between 400 g/of and <1000 g/mol.

The filtration membrane obtained as per the process of the present invention further has a high salt retention. The filtration membrane obtained as per the process of the present invention preferably has a salt retention above 50%. The filtration membrane obtained as per the process of the present invention more preferably has a salt retention of 50% to 99% coupled with a flux of 5 to 50 $l/m^2/h$. The filtration membrane obtained as per the process of the present invention more preferably has a salt retention >80% coupled with a flux of 6 to 30 $l/m^2/h$.

The membrane of the present invention further exhibits high stability at low pH values. Accordingly, the salt retention value changes by less than 5% within a period of 1 week at pH<1 measured at 25° C.

It is very particularly preferable for the filtration membrane obtained as per the process of the present invention to have an average molecular cut-off between 200 g/mol and <1000 g/mol and a salt retention between 80% and 99% coupled with a flux of 6 to 30 $l/m^2/h$. It is still more preferable for the filtration membrane obtained as per the process of the present invention to have an average molecular cut-off between 200 g/mol and <1000 g/mol and a salt retention between 95% and 99% coupled with a flux of 6 to 15 $l/m^2/h$.

The filtration membranes obtained as per the process of the present invention are particularly suitable for separation of molecules having a molar mass <1000 g/mol from aqueous solutions at pH<1 measured at 25° C.

The process of the present invention is an inexpensive way to provide filtration membranes having nanofiltration properties. There is further no need to use technically inconvenient, energy-intensive manufacturing processes to obtain nanofiltration membranes.

The examples which follow illustrate the invention:

EXAMPLES

Example 1

A filtration membrane comprising a bonded textile fabric coated with a hydrophilicized polyether sulphone (PESH), the UH004 product from Microdyn Nadir, was subjected to a treatment comprising 4 steps.

1st The surface of the membrane was rinsed with deionized water for 30 s by means of a spray bottle.
2nd Thereafter the rinsed membrane was fully immersed in a solution of 20 wt % polyethylene glycol (200 g/mol) in 2-propanol for 3 minutes. During this impregnating step, the solution was kept covered in order to avoid any evaporation of the solvent.
3rd The membrane was then removed from the 2-propanol/polyethylene glycol bath and laid aside for 10 minutes under atmospheric conditions. All the while a lid was used to keep the membrane covered up.
4th The membrane was finally dried for 10 minutes in a circulating air drying cabinet at 50° C.

Before and after this treatment, the membranes were tested with an aqueous solution of 2000 ppm of $MgSO_4$ in a crossflow filtration cell at a pressure of 10 bar and a feed volume flow of 4 l/h to determine their retention and flux. Table 1 shows the result of the measurement after a test period of about 4 hours, when an equilibrium state was safely established.

TABLE 1

| Membrane | Before treatment | | After treatment | |
|---|---|---|---|---|
| No. | Flux/l/m²h | Retention/% | Flux/l/m²h | Retention/% |
| 1 | 55.0 | 11.7 | 7.9 | 98.9 |

Example 2

A filtration membrane comprising a bonded textile fabric coated with a hydrophilicized polyether sulphone (PESH), the UH004 product from Microdyn Nadir, was subjected to a treatment comprising 3 steps.
1st The top and bottom sides of the membrane were rinsed with deionized water for 30 s at a time by means of a water hose.
2nd Thereafter the rinsed membrane was fully immersed in a solution of 20 wt % polyethylene glycol (200 g/mol) in ethanol for 3 minutes. During this impregnating step, the solution was kept covered in order to avoid any evaporation of the solvent.
3rd The membrane was finally dried for 5 minutes in a circulating air drying cabinet at 60° C.

Before and after this treatment, the membrane was tested with an aqueous solution of 2000 ppm of $MgSO_4$ in a crossflow filtration cell at a pressure of 10 bar and a feed volume flow of 4 l/h to determine their retention and flux. Table 2 shows the result of the measurement after a test period of about 4 hours, when an equilibrium state was safely established.

TABLE 2

| Membrane | Before treatment | | After treatment | |
|---|---|---|---|---|
| No. | Flux/l/m²h | Retention/% | Flux/l/m²h | Retention/% |
| 2 | 53.6 | 13.3 | 4.0 | 99.1 |

Example 3

A filtration membrane comprising a bonded textile fabric coated with a polyether sulphone (PES), the UP005 product from Microdyn Nadir, was subjected to a treatment comprising 3 steps.
1st The top and bottom sides of the membrane were rinsed with deionized water for 30 s at a time by means of a water hose.
2nd Thereafter the rinsed membrane was fully immersed in a solution of 20 wt % polyethylene glycol (200 g/mol) in ethanol for 3 minutes. During this impregnating step, the solution was kept covered in order to avoid any evaporation of the solvent,
3rd The membrane was finally dried for 10 minutes in a circulating air drying cabinet at 50° C.

Before and after this treatment, the membrane was tested with an aqueous solution of 2000 ppm of $MgSO_4$ in a crossflow filtration cell at a pressure of 10 bar and a feed volume flow of 4 l/h to determine their retention and flux. Table 3 shows the result of the measurement after a test period of about 4 hours, when an equilibrium state was safely established.

TABLE 3

| Membrane | Before treatment | | After treatment | |
|---|---|---|---|---|
| No. | Flux/l/m²h | Retention/% | Flux/l/m²h | Retention/% |
| 3 | 235.0 | 9.3 | 8.5 | 98.3 |

Example 4

A filtration membrane comprising a bonded textile fabric coated with a hydrophilicized polyether sulphone (PESH), the UH004 product from Microdyn Nadir, was subjected to a treatment comprising 3 steps, in order to test it subsequently for its stability in highly concentrated add.
1st The top and bottom sides of the initial membrane were placed for 5 minutes in a water bath filled with deionized water.
2nd Thereafter the rinsed membrane was fully immersed in a solution of 20 wt % polyethylene glycol (200 g/mol) in ethanol for 5 minutes. During this impregnating step, the solution was kept covered in order to avoid any evaporation of the solvent.
3rd The membrane was finally dried for 5 minutes in a circulating air drying cabinet at 60° C.

The membrane thus obtained was tested with an aqueous solution of 2000 ppm of $MgSO_4$ in a crossflow filtration cell at a pressure of 10 bar and a feed volume flow of 4 l/h to determine its retention and flux. The result is shown in the first column of Table 4.

A second membrane obtained by the process described above was placed for 7 days at room temperature in an aqueous solution of 20 wt % $H_2SO_4$. In order to avoid any evaporation of the solution and also external influences, the vessel in which the membrane was placed was tightly sealed. After this treatment, the membrane was rinsed with deionized water and tested with an aqueous solution of 2000 ppm of $MgSO_4$ in a crossflow filtration cell at a pressure of 10 bar and a feed volume flow of 4 l/h to determine its retention and flux. The result is shown in the second column of Table 4.

TABLE 4

| Membrane | Without immersion in acidic solution | | After immersion in 20 wt % $H_2SO_4$ | |
|---|---|---|---|---|
| No. | Flux/l/m²h | Retention/% | Flux/l/m²h | Retention/% |
| 4 | 4.1 | 99.3 | 4.8 | 97.4 |

The result reveals that there is no significant decrease in the flux and retention of a nanofiltration membrane following immersion in a strongly acidic solution. The membrane accordingly exhibits extraordinarily good stability in extremely acidic media.

Example 5

Two filtration membranes (membrane A and membrane B), comprising a bonded textile fabric coated with a hydrophilicized polyether sulphone (PESH), the UH004 product from Microdyn Nadir, were subjected to two different treatments comprising 3 steps.
1st The top and bottom sides of the membranes were rinsed with deionized water for 30 s by means of a spray bottle.
2nd Thereafter the rinsed membranes were fully immersed in a solution of 22 wt % polyethylene glycol (200 g/mol) in deionized water (membrane A) or 22 wt % polyethylene glycol (200 g/mol) in ethanol (membrane B) for 3 minutes. During this impregnating step, the solutions were kept covered in order to avoid any evaporation of the solvent.
3rd The membranes were finally dried for 10 minutes in a circulating air drying cabinet at 50° C.

After this treatment, the membranes were tested with an aqueous solution of 2000 ppm of MgSO₄ in a crossflow filtration cell at a pressure of 10 bar and a feed volume flow of 4 l/h to determine their retention and flux. Table 5 shows the result of the measurement after a test period of about 4 hours, when an equilibrium state was safely established.

TABLE 5

| Membrane No. | Membrane A- PEG in water | | Membrane B- PEG in ethanol | |
|---|---|---|---|---|
| | Flux/l/m²h | Retention/% | Flux/l/m²h | Retention/% |
| 5 | 128.7 | 10.8 | 5.6 | 97.0 |

What is claimed is:

1. A process for preparing a filtration membrane having an average molecular cut-off less than 1000 g/mol, the process comprising:
   a) contacting at least one filtration membrane having an average molecular cut-off between 3,000 g/mol and 15,000 g/mol, and comprising at least one bonded textile fabric coated with at least one of: a polyether sulphone and a hydrophilicized polyether sulphone, with an aqueous medium having a water content of not less than 99%,
   b) contacting the filtration membrane from step a) with at least one polyethylene glycol in the presence of at least one different aliphatic, cyclic or non-cyclic, branched or unbranched, saturated or unsaturated, mono-, di- or trihydric alcohol, wherein the polyethylene glycol is used in an amount of 5 wt % to 50 wt %, based on the combined amount of polyethylene glycol and alcohol, and the sum total of polyethylene glycol and alcohol used in process step b) is greater than 95 wt %, based on the overall amount of the mixture used, and
   c) drying the filtration membrane from step b).

2. The process according to claim 1, wherein the filtration membrane used in process step a) has a salt retention between 5% and 15%, wherein this salt retention is measured at 25° C. with an aqueous 2000 ppm MgSO₄ solution in a crossflow filtration unit at a feed volume flow of 4 l/h and a feed pressure of 10 bar.

3. The process according to claim 1, wherein, in process step a), the filtration membrane is bonded textile fabric coated with the hydrophilicized polyether sulphone.

4. The process according to claim 1, wherein, in process step a), the aqueous medium has a conductivity less than or equal to 10 μS/cm at 25° C.

5. The process according to claim 1, wherein, in process step a), the filtration membrane is contacted for 10 s to 600 s.

6. The process according to claim 1, wherein the alcohol comprises monohydric aliphatic saturated alcohols.

7. The process according to claim 1, wherein the polyethylene glycols have an average molar mass of 106 g/mol to 2000 g/mol.

8. The process according to claim 1, wherein the polyethylene glycols are polyethylene glycols of formula (I)

where n is from 2 to 10.

9. The process according to claim 1, the filtration membrane is treated in process step b) for 2 min to 6 min.

10. The process according to claim 1, wherein the amount of polyethylene glycol used in process step b) is between 10 wt % and 40 wt %, based on the combined amount of polyethylene glycol and alcohol.

11. The process according to claim 1, wherein the filtration membrane is dried at a temperature of 40° C. to 70° C.

12. The process according to claim 1, wherein the filtration membrane is dried for 1 to 15 min.

13. The process according to claim 1, wherein the filtration membrane obtained has an average molecular cut-off between 200 g/mol and 1000 g/mol and a salt retention between 80% and 99% coupled with a flux of 6 to 30 l/m²/h.

14. The process according to claim 1, wherein the filtration membrane obtained has a salt retention which decreases by less than 2% within a period of 1 week at pH less than 1 measured at 25° C.

15. The process according to claim 1, wherein:
   the bonded textile fabric comprises fibrous nonwoven webs laid from polyethylene or polypropylene or from mixtures thereof, and have a thickness of 50 to 250 μm;
   the bonded textile fabric comprises a coating membrane comprising greater than 98 wt % of polyether sulphone having an average molecular weight between 4,000 and 100,000 g/mol based on the total amount of the membrane, or greater than 98 wt % of hydrophilicized polyether sulphone having an average molecular weight between 40,000 and 100,000 g/mol based on the overall amount of the membrane;
   the aqueous medium has a water content of 99.9% and a conductivity less than or equal to 1 μS/cm at 25° C.;
   in process step a), the filtration membrane s contacted with the aqueous medium for 10 s to 350 s;
   the alcohol comprises methanol, ethanol, 1-propanol, 2-propanol, n-butanol, i-butanol, t-butanol, 1-pentanol, 2-pentanol, or 3-pentanol or mixtures thereof;
   the polyethylene glycols have a molar mass of 106 to 600 g/mol and are polyethylene glycols of formula (I)

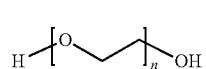 (I)
where n is from 2 to 10;
in process step b), the polyethylene glycol is used in an amount of 10 wt % to 40 wt % based on the combined amount of polyethylene glycol and alcohol, and the total amount of polyethylene glycol and alcohol used is greater than 98 wt %, based on the overall amount of the mixture used; and
the filtration membrane is dried at a temperature of 50° C. to 65° C.
* * * * *